United States Patent
Matsuura et al.

(10) Patent No.: US 8,169,706 B2
(45) Date of Patent: May 1, 2012

(54) LIGHT-DIFFUSING PLATE FOR LIQUID CRYSTAL DISPLAY DEVICE AND POLYCARBONATE RESIN COMPOSITION FOR LIGHT-DIFFUSING PLATE FOR LIQUID CRYSTAL DISPLAY DEVICE

(75) Inventors: Michio Matsuura, Sanda (JP); Norihito Taki, Sanda (JP); Takehisa Kishimoto, Sanda (JP)

(73) Assignee: Nippon Polyester Co., Ltd., Osaka (JP)

( * ) Notice: Subject to any disclaimer, the term of this patent is extended or adjusted under 35 U.S.C. 154(b) by 1362 days.

(21) Appl. No.: 10/556,635

(22) PCT Filed: Jun. 1, 2004

(86) PCT No.: PCT/JP2004/007507
§ 371 (c)(1),
(2), (4) Date: Nov. 10, 2005

(87) PCT Pub. No.: WO2004/109379
PCT Pub. Date: Dec. 16, 2004

(65) Prior Publication Data
US 2007/0053031 A1 Mar. 8, 2007

(30) Foreign Application Priority Data
Jun. 4, 2003 (JP) .................................. 2003-159961

(51) Int. Cl.
*G02B 5/02* (2006.01)
(52) U.S. Cl. ........................ 359/599; 428/1.3; 428/212
(58) Field of Classification Search .................. 428/212; 359/453, 599, 456, 112, 457, 212, 601, 117
See application file for complete search history.

(56) References Cited

U.S. PATENT DOCUMENTS

| | | | | |
|---|---|---|---|---|
| 5,352,747 A | * | 10/1994 | Ohtsuka et al. | 525/464 |
| 5,449,710 A | * | 9/1995 | Umeda et al. | 524/165 |
| 5,672,409 A | * | 9/1997 | Miyakawa et al. | 428/141 |
| 6,042,945 A | | 3/2000 | Mackawa | |
| 2001/0030861 A1 | * | 10/2001 | Oda et al. | 362/31 |

(Continued)

FOREIGN PATENT DOCUMENTS

JP 05-257002 10/1993

(Continued)

OTHER PUBLICATIONS

Billmeyer, Fred W. Textbook of Polymer Science. John Wiley and Sons. 3rd Ed. New York: 1984. pp. 476 and 477. ISBN 0-471-03196-8.*

(Continued)

*Primary Examiner* — Angela Ortiz
*Assistant Examiner* — Michael Nelson
(74) *Attorney, Agent, or Firm* — Kilyk & Bowersox, P.L.L.C.

(57) ABSTRACT

Provided are: a light-diffusing plate for a liquid crystal display device which plate can give an assured or improved luminance with assured light-diffusibility, suppress itself from dimensional changes caused by moisture absorption, and also prevent the device from deterioration caused by ultraviolet light generated from a lighting unit; and a polycarbonate resin composition for a light-diffusing plate which has both high light transmittivity and light-diffusibility and is excellent in flame retardancy. The present invention is a light-diffusing plate for a liquid crystal display device which plate has a lamination structure comprising two or more kinds of plastic layers; said lamination structure having at least two layers of which are different from each other in refractive index.

9 Claims, 3 Drawing Sheets

U.S. PATENT DOCUMENTS

| | | |
|---|---|---|
| 2002/0102367 A1 | 8/2002 | Shimodaira et al. |
| 2002/0120044 A1* | 8/2002 | Blackburn et al. ............ 524/161 |
| 2002/0149719 A1* | 10/2002 | Kanatsu et al. ............... 349/112 |
| 2003/0068512 A1* | 4/2003 | Takahashi et al. ............ 428/480 |
| 2003/0156238 A1 | 8/2003 | Hiraishi et al. |

FOREIGN PATENT DOCUMENTS

| | | |
|---|---|---|
| JP | 06-071832 | 3/1994 |
| JP | 08-286005 | 11/1996 |
| JP | 10-046022 | 2/1998 |
| JP | 10-160914 | 6/1998 |
| JP | 10-206615 | 8/1998 |
| JP | 10-333140 | 12/1998 |
| JP | 11-231113 | 8/1999 |
| JP | 2002-1967110 | 7/2002 |
| JP | 2002-258013 | 9/2002 |
| JP | 2002-347155 | 12/2002 |
| JP | 2002-351353 | 12/2002 |
| JP | 2003-050306 | 2/2003 |

OTHER PUBLICATIONS

Polymer Data Handbook, Polycarbonate, Tarek M Madkour. 1999. Oxford Univerity Press, Inc. p. 363-367.*

International Search Report for PCT/JP2004/007507 dated Aug. 24, 2004.

Translation of International Preliminary Report on Patentability and Written Opinion of the International Searching Authority for International Patent Application No. PCT/JP2004/007507 dated May 11, 2006.

* cited by examiner

LIGHT-DIFFUSING PLATE FOR LIQUID CRYSTAL DISPLAY DEVICE AND POLYCARBONATE RESIN COMPOSITION FOR LIGHT-DIFFUSING PLATE FOR LIQUID CRYSTAL DISPLAY DEVICE

This application is a National Stage Application of PCT/JP2004/007507, filed Jun. 1, 2004.

TECHNICAL FIELD

The present invention relates to a light-diffusing plate for a liquid crystal display device and to a polycarbonate resin composition for the light-diffusing plate for a liquid crystal display device, and more specifically to a light-diffusing plate for a liquid crystal display device capable of maintaining or improving the luminance with the assured light diffusibility, and to a polycarbonate resin composition for use in the light-diffusing plate for a liquid crystal display device.

The application claims the right of priority from Japanese Patent Application No. 2003-159961 which is incorporated herein by reference.

BACKGROUND ART

Liquid crystal display devices are widely used as the screens of cell phones, personal computers, TV monitors, and the like. Specifically for example, their demand has been increasing in TVs and the like. The liquid crystal display device is generally composed of a liquid crystal display element and a lighting unit having a light source such as a cold cathode fluorescent lamp which irradiates the element. The light source irradiates the liquid crystal display element to form an image. The manner of emitting light to the liquid crystal display element includes: a frontlight type which emits light from the front of the liquid crystal display element; and a backlight type which emits light from the rear of the liquid crystal display element. The backlight type is further grouped into a direct type which irradiates the element from the rear with light from the light source, and an edge type which irradiates the element from the side.

In order to emit light to a liquid crystal display element uniformly over the whole area to attain a high level in display quality, the backlight type, for example, needs a light-diffusing plate to diffuse light from a light source uniformly.

Conventional light-diffusing plate is made of an acrylic resin because of the high light transmittivity to give high luminance. Acrylic resin, however, likely absorbs moisture depending on the use conditions, resulting in deflection and warp brought about in the light-diffusing plate to deteriorate the dimensional stability. In recent years, the increasing demand of a large scaled liquid crystal display device for use in a big TV and the like requires the excellent dimensional stability. Furthermore, there are requested also the durability against ultraviolet light generated from a light source and the flame retardancy.

There is also disclosed a light-diffusing plate prepared by mixing a polycarbonate resin with a light-diffusing agent, (for example, refer to Patent Document 1). The polycarbonate resin is excellent in property such as dimensional stability and heat resistance. However, the polycarbonate resin has a relatively high refractive index and is inferior in light transmittivity. Accordingly, the polycarbonate resin is used for the light-diffusing plate in a liquid crystal display device, to decrease the luminance of the device. A means is demanded to improve the optical characteristics of the light-diffusing plate.

Furthermore, to improve the light diffusibility and the impact resistance, there are disclosed a light-diffusing plate prepared by mixing an acrylic resin with a light-diffusing agent and a rubber-like polymer, (for example, refer to Patent Document 2), a light-diffusing plate prepared by mixing a transparent resin with a specific liquid crystal polymer, (for example, refer to Patent Document 3), and a light-diffusing sheet using an epoxy resin layer with a mixed light-diffusing agent, a gas-barrier layer, and an urethane-acrylate resin layer, (for example, refer to Patent Document 4). All of these light-diffusing plates and light-diffusing sheet, however, need a means for maintaining or improving the luminance with the assured light diffusibility and further suppressing the dimensional changes caused by moisture absorption, while preventing the device from deterioration caused by ultraviolet light generated from the lighting unit.

In order to improve the durability against ultraviolet light, there is disclosed a liquid crystal display device having a layer for cutting the ultraviolet light between the light source and the liquid crystal display element, (for example, refer to Patent Document 5). The disclosed liquid crystal display device, however, need a means for further improving the display quality of the liquid crystal display device by suppressing the dimensional changes caused by moisture absorption while improving the luminance of the liquid crystal display device. There is also disclosed a laminated product comprising a polycarbonate resin layer laminated with acrylic resin layer, (for example, refer to Patent Document 6). That kind of laminated product, however, is generally used for lighting material, sound-proof wall, and the like. The laminated product, which is improved in light transmittivity and light diffusibility to give a light-diffusing plate suitable for use in a liquid crystal display device, further needs a means for the light-diffusing plate to improve the liquid crystal display device in display quality.

On the other hand, as a resin composition suitable for use in a light-diffusing plate, there is disclosed a light-diffusing resin composition composed of an aromatic polycarbonate-based resin containing a block of polyorganosiloxane, and a cross linked acrylic resin bead, (for example, refer to Patent Document 7). The light-diffusing plate using the resin composition, however, needs a means for further improving the light transmittance with the assured sufficient light diffusibility, thereby to give excellent optical characteristics, and to allow suitable application also for the liquid crystal display devices in household electric appliances.

[Patent Document 1] JP5-257002, A (1993) (the term "A" referred to herein signifies the "Patent application Laid-open").
[Patent Document 2] JP11-105207, A (1999)
[Patent Document 3] JP11-231113, A (1999)
[Patent Document 4] JP2002-351353, A
[Patent Document 5] JP10-333140, A (1998)
[Patent Document 6] JP6-71832, A (1994)
[Patent Document 7] JP10-46022, A (1998)

DISCLOSURE OF THE INVENTION

[Problems To Be Solved By The Invention]

In view of the above-described current situation, an object of the present invention is to provide a light-diffusing plate for a liquid crystal display device which plate can maintain or improve luminance with the assured light diffusibility, and further suppress dimensional changes caused by moisture absorption, and further prevent the device from deterioration caused by ultraviolet light generated by a lighting unit; and a polycarbonate resin composition for the light-diffusing plate which composition has high light transmittivity and light diffusibility, and is excellent in flame-retardancy.

[Means to Solve the Problems]

The present inventors made detail studies of the light-diffusing plate for a liquid crystal display device, and found that the light-diffusing plate has a lamination structure comprising two or more kinds of plastic layers and having at least two layers of which are different from each other in refractive index, allowing improvement of the optical characteristics. For example, the light-diffusing plate is constructed to comprise a light-diffusing layer for mainly diffusing light and another layer being different from the light-diffusing layer in refractive index where the light-diffusing layer is made of a material excellent in dimensional stability such as polycarbonate, and has its light-incidence surface, which light is from a light source of lighting unit, and/or its light-emission surface on which layers are made of an acrylic resin and/or a fluorocarbon resin to have their lower refractive indexes, allowing improved transmittivity of light with the assured light-diffusibility and suppression of dimensional changes caused by moisture absorption. Inversely, the light-diffusing layer is made of an acrylic resin and/or a fluorocarbon resin to have a lower refractive index and has its light-incidence surface, which light is from a light source of lighting unit, and/or its light-emission surface on which layers are formed to have their higher refractive indexes, allowing diffusion of light from the light source between the layer having a higher refractive index and the lighting unit to improve the light-diffusibility.

It is found that the light-diffusing layer is thickened to have an equilibrium water absorption of a specified value or below, allowing sufficient suppression of dimensional changes caused by moisture absorption, and that an ultraviolet light absorber is contained in another layer being different from the light-diffusing layer in refractive index, allowing prevention of the device from deterioration caused by ultraviolet light generated from the lighting unit. These effects also are found to improve the liquid crystal display device in display quality, thereby to solve the above problems.

It is also found that a polycarbonate resin is mixed with a particle-shaped resin being different from the polycarbonate resin in refractive index to use as a light-diffusing layer, allowing further improvement of the light diffusibility and the light transmittivity. Furthermore, it is found that a flame retardant agent is further mixed in the layer to provide the layer with excellent flame retardancy, allowing suitable application for liquid crystal display devices in household electric appliances such as a personal computer and a TV. In addition, it is found that the polycarbonate resin composition, which comprises a polycarbonate resin, a particle-shaped resin being different from the polycarbonate resin in refractive index, and the metal salt of an organic sulfur compound as a flame retardant agent, can be suitably used for a light-diffusing plate in a liquid crystal display device. These findings are based to complete the present invention.

That is, the present invention provides a light-diffusing plate for a liquid crystal display device which plate has a lamination structure comprising two or more kinds of plastic layers; said lamination structure having at least two layers of which are different from each other in refractive index.

The present invention is described in detail below.

The lamination structure of the light-diffusing plate in a liquid crystal display device according to the present invention is not specifically limited as long as it is a multilayer structure comprising two or more layers with two or more kinds of plastics laminated on each other. For example, the light-diffusing plate is constructed to comprise a light-diffusing layer for mainly diffusing light and another layer being different from the light-diffusing layer in refractive index. The preferred embodiment of such a light-diffusing plate for use in liquid crystal display device comprises a light-diffusing layer (A) and an adjacent layer (B) thereto, resulting in an increased luminance in case of A>B, and in an increased light diffusibility in case of A<B, where A designates the refractive index of the light-diffusing layer (A) and B designates that of the adjacent layer (B).

The adjacent layer (B) is preferably positioned to contact with the light-diffusing layer (A). However, (an)other layer(s) may be inserted between the light-diffusing layer (A) and the adjacent layer (B) so that the light-diffusing layer (A) and the adjacent layer (BY are not be contacted with each other.

The term "refractive index" referred to herein signifies a value obtained by the measurement in accordance with JIS K-7142-1996. The refractive index can be determined by the Abbe's refractometer (1-type, manufactured by Atago Co., Ltd.). The difference in refractive index between the light-diffusing layer (A) and the adjacent layer (B) is preferably 0.05 or more, and more preferably 0.1 or more, to attain the effect of the present invention. In order to improve the luminance, the refractive index of the adjacent layer is preferably 1.5 or less.

In order to evaluate the luminance, a Y-stimulus value is preferably determined. The higher Y-stimulus value allows evaluation of the higher luminance. In the present invention, the Y-stimulus value is preferably 40 or more. The Y-stimulus value can be determined by a spectrophotometer (UV-3100PC, manufactured by Shimadzu Corporation).

In order to evaluate the light diffusibility, a haze value is preferably determined. The higher haze value allows evaluation of the higher light diffusibility. In the present invention, the haze value is preferably 90% or more, and more preferably 93% or more. The haze value can be determined by a turbidity meter (NDH-2000, manufactured by NIPPON DENSHOKU INDUSTRIES CO., LTD.) in accordance with JIS K7105.

As the light-diffusing plate for a liquid crystal display device, the configurations as shown in FIGS. 1(a) through (c) are mentioned. These configurations are preferred embodiments of the present invention. In FIG. 1, the lighting unit is positioned downward, and the liquid crystal display element is positioned upward (both of them are not shown). FIG. 1(a) is a configuration wherein the adjacent layer (B) and the light-diffusing layer (A) are arranged in this order from the lower side (the lighting unit side). FIG. 1(b) is a configuration wherein the light-diffusing layer (A) and the adjacent layer (B) are arranged in this order from the lower side. FIG. 1(c) is a configuration wherein the adjacent layer (B), the light-diffusing layer (A), and another adjacent layer (B) are arranged in this order from the lower side. In case of a plurality of light-diffusing layers (A) or adjacent layers (B), they may be the same or different from each other.

Referring to FIG. 1, the configuration of (a) in case of refractive index A>B of the light-diffusing layer (A) and the adjacent layer (B) decreases reflection light in quantity and increases incidence light in quantity, because the layer having a lower refractive index is positioned on a source which light from light source enters. The configuration of (b) decreases reflection light in quantity in the upper side of the light-diffusing layer (A) to facilitate transmittance of light entering the light-diffusing layer (A), because the layer having a lower refractive index is positioned on the surface from which light leaves the light-diffusing layer (A). The configuration of (c)

increases both incidence light and transmitted light in quantity. Consequently, any above-described configuration enhances the luminance.

The configuration of (a) in case of refractive index A<B of the light-diffusing layer (A) and the adjacent layer (B) diffuses light from the light source between the adjacent layer (B) positioned beneath the light-diffusing layer (A) and the light-reflecting plate (reflector) of the lighting unit. The configuration of (b) in this case diffuses the light entering the light-diffusing layer (A) between the adjacent layer (B) positioned above the light-diffusing layer (A) and the lighting unit. The configuration of (c) in this case diffuses the light from the light source not only between the adjacent layer (B) positioned beneath the light-diffusing layer (A) and the lighting unit, but also between the adjacent layer (B) positioned above the light-diffusing layer (A) and the lighting unit. Consequently, any above-described configuration enhances the light diffusibility.

In the light-diffusing plate for a liquid crystal display device according to the present invention, the above-described lamination structure comprises preferably the light-diffusing layer (A) and the adjacent layer (B), to have the light-diffusing layer (A)>the adjacent layer (B) in thickness. The light-diffusing layer (A), which is equal to or smaller than the adjacent layer (B) in thickness, is likely to absorb moisture to cause a dimensional change on the light-diffusing plate in a liquid crystal display device. More preferably, the light-diffusing layer (A) is two times or more as much as the adjacent layer (B) in thickness, and still more preferably four times or more. For the use of the light-diffusing plate in a liquid crystal display device, the light-diffusing layer (A) is suitably 0.5 to 3 mm in thickness, and the adjacent layer (B) is suitably 0.001 to 1 mm in thickness.

In addition, the light-diffusing layer (A) has preferably equilibrium water absorption of 0.5% or less. The layer may have that of beyond 0.5% to lower the dimensional stability of the light-diffusing plate in a liquid crystal display device. The layer has still more preferably that of 0.2% or less.

In the present invention, the above-described lamination structure has preferably a configuration wherein the structure comprises the light-diffusing layer (A) and the adjacent layer (B) to have the light-diffusing layer (A)>the adjacent layer (B) in thickness, and the light-diffusing layer (A) has an equilibrium water absorption of 0.5% or less. The equilibrium water absorption can be determined in accordance with the D-method specified by JIS K7209-2000.

A plastics applicable to the light-diffusing plate for a liquid crystal display device according to the present invention, a layer made of the plastics, a method for manufacturing the light-diffusing plate for a liquid crystal display device, a liquid crystal display device using the light-diffusing plate for liquid crystal display device, and the like are described more details below.

The plastics for the lamination structure of the light-diffusing plate for a liquid crystal display device according to the present invention includes a plastic for providing a layer having a higher refractive index and a plastic for providing a layer having a lower refractive index.

The plastics according to the present invention are prepared by a molding method, a coating method, and the like, and may be any kind as long as they are made by polymers and the like. The preferred plastics are given below.

The plastics for providing a layer having a higher refractive index are preferably made of a resin having an aromatic ring. Such a resin includes a polycarbonate resin, a polystyrene resin, a polyethylene terephthalate resin, a polyarylate resin, a polysulfone resin, and a polyether sulfone resin. Among these resins, the polycarbonate resin is preferred.

As the above polycarbonate resin, a polymer derived from a divalent phenol can be used. Preferred Examples of the divalent phenol are 2,2-bis(4-hydroxyphenyl)propane [Bisphenol A], 1,1-bis(4-hydroxyphenyl)ethane, 1,1-bis(4-hydroxyphenyl)cyclohexane, 2,2-bis(4-hydroxy-3,5-dimethylphenyl)propane, 2,2-bis(4-hydroxy-3-methylphenyl)propane, bis(4-hydroxyphenyl)sulfide, and bis(4-hydroxyphenyl)sulfone. One or more of them can be applied. Among them, the polycarbonate resin using 2,2-bis(4-hydroxyphenyl) propane [Bisphenol A] is preferred, and the polycarbonate resin has preferably a weight average molecular weight of 20,000 or more and 70,000 or less as determined from a calibration curve drawn by the gel-permeation chromatography (GPC) using a monodisperse polystyrene as the standard, and more preferably 30,000 or more and 60,000 or less. That type of resin can be manufactured by a phosgene process, a transesterification process, and the like. An appropriate molecular weight modifier for improving moldability, a branching agent for improving processability, a catalyst for enhancing reaction, and the like may be used to produce the polycarbonate resin if necessary.

The plastics for providing a layer having a lower refractive index are preferably made of an aliphatic resin. Such a resin includes more preferably an acrylic-based resin, a fluororesin, a polycycloolefin resin, and a polyolefin resin in view of light transmittivity. An inorganic resin such as a silicone resin also may be suitably used. Examples of above acrylic-based resin are prepared by polymerizing monomers including: methacrylic acid ester such as methylmethacrylate, ethylmethacrylate, butylmethacrylate, cyclohexylmethacrylate, phenylmethacrylate, benzylmethacrylate, 2-ethylhexylmethacrylate, and 2-hydroxyethylmethacrylate; and acrylic acid ester such as methylacrylate, ethylacrylate, butylacrylate, cyclohexylacrylate, phenylacrylate, benzylacrylate, 2-ethylhexylacrylate, and 2-hydroxyethylacrylate. Polymers prepared by polymerizing one or more of these monomers may be used. The acrylic-based resin may be prepared by copolymerizing a metacrylic acid ester and/or an acrylic acid ester, and a monomer which is copolymerizable with them. Examples of the copolymerizable monomer are: an unsaturated acid such as methacrylic acid and acrylic acid; styrene, butadiene, isoprene, α-methylstyrene, acrylonitrile, methacrylonitrile, maleic acid anhydride, phenylmaleimide, and cyclohexylmaleimide. The acrylic-based resin also may be obtained by copolymerizing glutaric acid anhydride, glutarimide, and the like. The acrylic-based resin also may have a branched structure. The applicable branching agent includes a multifunctional vinyl compound such as ethyleneglycol dimethacrylate/acrylate, p- or m-divinylbenzene, and trimethylolpropane trimethacrylate/acrylate.

Examples of the applicable fluororesin are made from a fluorinated hydrocarbon such as polyvinylidenefluoride, tetrafluoroethylene/hexafluoropropylene copolymer [FEP], ethylene/tetrafluoroethylene copolymer [ETFE], polychlorotrifluoroethylene [PCTFE]. Preferred products of that type of fluororesin are SITOP (manufactured by Asahi Glass Co., Ltd.) and TEFLON® AF (manufactured by DuPont). Those fluororesins may be used alone or in combination with two or more of them.

Examples of the polycycloolefin resin are ZEONEX and ZEONOR (products of Zeon Corporation). Examples of the polyolefin resin are TPX, PP and the like.

According to the present invention, the above plastics are used to form a layer having a higher refractive index and a layer having a lower refractive index. For example, at least one of these layers becomes a light-diffusing layer for mainly diffusing light. A preferred embodiment of such a light-diffusing layer (A) comprises two or more kinds of resins (plastics) which are different from each other in refractive index. The preferable embodiment is prepared by mixing a polycarbonate resin and a particle-shaped resin being different from the polycarbonate resin in refractive index. The embodiment can further improve the light-diffusing plate of the present invention in total light transmittance and haze value, allowing the light-diffusing plate to exhibit more uniform and higher light diffusibility.

As the above polycarbonate resin, the plastics for providing a layer having a higher refractive index are mentioned.

The resin in a particle-shape being different from the polycarbonate resin in refractive index (hereinafter also referred to simply as the "particle-shaped resin"), bends a light path from the light source to diffuse light because of a difference from the polycarbonate resin in refractive index. The difference in refractive index is preferably 0.06 or more. The difference in refractive index, which is less than 0.06, may be difficult to bend a light path, thereby to fail in providing a sufficient light diffusibility. The difference is more preferably 0.08 or more.

For a preferred particle-shaped resin, the aliphatic resin as described in the plastics for providing a layer having a lower refractive index is preferably used. The acrylic-based resin is particularly preferred. The acrylic-based resin is as described before. The particle-shaped resin has preferably an average particle size of 1 to 30 μm. The particle-shaped resin, which has an average particle size of less than 1 μm, can not provide a high light transmittance, and, which has that of more than 30 μm, can not exhibit a sufficient light diffusibility. The average particle size is more preferably 3 to 15 μm.

The particle-shaped resin is preferably mixed at a lower limit of 1 part by weight and at an upper limit of 10 parts by weight with 100 parts by weight of the polycarbonate resin. The particle-shaped resin, which is mixed at less than 1 part by weight, may exhibit no sufficient light diffusion performance, and, which is mixed at more than 10 parts by weight, may lower a total light transmittance, thereby to fail in providing the light-diffusing plate with sufficient brightness for a liquid crystal display device. More preferably, the lower limit is 1.3 parts by weight and the upper limit is 8 parts by weight. The particle-shaped resin is preferably mixed at 1-10 parts by weight, and more preferably 1.3-8 parts by weight.

One preferred embodiment of the light-diffusing plate for a liquid crystal display device of the present invention is a embodiment wherein the plate has a light-diffusing layer (A) which is prepared by mixing 100 parts by weight of a polycarbonate resin with 1-10 parts by weight of the particle-shaped resin being different from the polycarbonate resin in refractive index.

The light-diffusing layer has preferably an embodiment further comprising a flame retardant agent. The light-diffusing plate is provided with excellent flame retardancy so that the plate can be suitably applied also to liquid crystal display devices for household electric appliances such as a personal computer and a TV.

The particularly preferred flame retardant agent is a metal salt of an organic sulfur compound. One preferred embodiment of the present invention is an embodiment wherein the light-diffusing layer comprises further the metal salt of an organic sulfur compound. Such a metal salt of an organic sulfur compound includes the metal salt of: N-(p-tolylsulfonyl)-p-toluenesulfoimide, N-(N'-benzylaminocarbonyl)sufanylimide, N-(phenylcarboxyl)-sufanylimide, diphenylsulfone-3-sulfonic acid, diphenylsulfone-3,3'-disulfonic acid, diphenylsolfone-3,4'-disulfonic acid, p-toluenesulfonic acid, p-styrenesulfonic acid, 1-naphthalenesulfonic acid, dimethylisophthalate-5-sulfonic acid, 2,6-naphthalenedisulfonic acid, benzenesulfonic acid, o-benzenedisulfonic acid, 2,4,6-trichloro-5-sulfodimetylisophtalate, 2,5-dichlorobenzenesulfonic acid, 2,4,5-trichlorobenzenesulfonic acid, or perfluoroalkanesulfonic acid.

One or more of them can be used.

The flame retardant agent is preferably added (mixed) at a content of from the lower limit 0.005 parts by weight to the upper limit 0.2 parts by weight based on 100 parts by weight of the polycarbonate resin. The flame retardant agent, which is added at a content of less than 0.005 parts by weight, can not exhibit a sufficient flame retardancy, and, which is added at that of more than 0.2 parts by weight, can not give a sufficient heat stability for sheet processing. More preferably, the lower limit is 0.01 parts by weight, and the upper limit is 0.15 parts by weight. Still more preferably, the lower limit is 0.02 parts by weight, and the upper limit is 0.1 parts by weight. The flame retardant agent is preferably added at a content of 0.005 to 0.2 parts by weight, more preferably 0.01 to 0.15 parts by weight, and still more preferably 0.02 to 0.1 parts by weight.

In case of the metal salt of an organic sulfur compound added, the particularly preferred embodiment is an embodiment wherein the metal salt of an organic sulfur compound is a metal salt as described above for examples and is added at a content of 0.005 to 0.2 parts by weight based on 10 parts by weight of the polycarbonate resin. The metal salt of an organic sulfur compound is most preferably the metal salt of a perfluoroalkane sulfonate.

According to the present invention, the method for mixing the polycarbonate resin, the particle-shaped resin, and the flame retardant agent is not specifically limited, and includes a method for mixing them by a known mixer such as a tumbler, a ribbon blender, and a high speed mixer, followed by melting to knead them.

In the suitable embodiment of the light-diffusing plate for a liquid crystal display device according to the present invention, the adjacent layer (B) comprises preferably an ultraviolet light absorber. This embodiment can prevent the other layer, the liquid crystal display element, and the like located above the adjacent layer (B) from deterioration caused by the ultraviolet light emitted from the lighting unit. For example, in FIG. 1, the configuration of (*a*) can prevent the light-diffusing layer (A) as well as layers positioned above the light-diffusing layer (A) from deterioration, thereby to provide a good result, because the adjacent layer (B) positioned beneath the light-diffusing layer (A) (light source side) comprises the ultraviolet light absorber. The configuration of (b) can prevent the layers positioned above the light-diffusing layer (A) from deterioration. In the configuration of (*c*), the adjacent layer (B) positioned below the light-diffusing layer (A) comprises preferably the ultraviolet light absorber.

The ultraviolet light absorber includes benzotriazole-based, 2-hydroxybenzophenone-based, and salicylic phenylester-based ones. Examples of those kinds are: a triazole such as 2-(5-methyl-2-hydroxyphenyl)benzotriazole, 2-[2-hydroxy-3,5-bis(α,α-dimethylbenzyl)phenyl]-2H-benzotriazole, and 2-(3,5-di-t-butyl-2-hydroxyphenyl)benzotriazole; and a benzophenone such as 2-hydroxy-4-methoxybenzophenone, 2-hydroxy-4-octoxybenzophenone, and 2,2'-dihydroxy-4-methoxybenzophenone. Examples of the ultraviolet light absorbing agent having a molecular weight of 400 or more are: a benzotriazole such as 2-[2-hydroxy-3,5-bis(α,α-dimethylbenzyl)phenyl]-2-benzotriazole, and 2,2-methylenebis[4-(1,1,3,3-tetrabutyl)-6-(2H-benzotriazole-2-yl)phenol]; a triazine such as 2-(4,6-diphenyl-1, 3,5-triazine-2-yl)-5-[(hexyl)oxy]phenol; a hindered amine such as bis(2,2,6,6-tetramethyl-4-piperidyl)sebacate, and bis(1,2,2,6,6-pentamethyl-4-piperidyl)sebacate; and a hybrid having both a hindered phenol structure and a hindered amine structure in the molecule, such as 2-(3,5-di-t-butyl-4-hydroxybenzyl)-2-n-butylmaloic bis(1,2,2,6,6-pentamethyl-4-peperidyl), and 1-[2-[3-(3,5-di-t-budryl-4-hydroxyphenyl)propionyloxy]ethyl]-4-[3-(3,5-di-t-butyl-4-hydroxypheny)propionyloxy]-2,2,6, 6-tetramehylpiperidine. One or more of them can be used. The preferred ones are 2-[2-hydroxy-3,5-bis(α,α-dimethylbenzyl)phenyl]-2-benzotriazole, 2,2-methylenebis[4-(1,1,3,3-tetrabutyl)-6-(2H-benzotriazole-2-yl)phenol], and 2-(4,6-diphenyl-1,3,5-triazine-2-yl)-5-[(hexyl)oxy]phenol, and more preferable ones are 2,2-methylenebis[4-(1,1,3,3-tetrabutyl)-6-(2H-benzotriazole-2-yl)phenol] and 2-(4,6-diphenyl-1,3,5-triazine-2-yl)-5-[(hexyl)oxy]phenol.

In the preferred embodiment, the ultraviolet light absorber has a molecular weight of 400 or more, because it is hard to volatilize due to its high boiling point, is hard to fly away during molding at a high temperature, and can be added by its relatively little amount to provide functional effects. Such an ultraviolet light absorber is preferred because it is hard to migrate from the layer where it is contained into the other layer, and is hard to separate out on the surface of the light-diffusing plate for liquid crystal display device so that it may keep its content for a long time, and allow the plate to maintain durability against ultraviolet light.

The ultraviolet light absorber has preferably a content of 0.05% by mass or more and 50% by mass or less relative to 100% by mass of the total ingredients comprised in the adjacent layer (B) containing. the ultraviolet light absorber. The ultraviolet light absorber, which has a content of less than 0.05% by mass, may decrease the effect for protecting the device against ultraviolet light emitted from the lighting unit. The ultraviolet light absorber, which has that of more than 50% by mass, may not give so great an effect as expected from the content. The ultraviolet light absorber has more preferably a content of 0.1% by mass or more and 40% by mass or less relative to the total mass of ingredients comprised in the adjacent layer (B) containing the ultraviolet light absorber.

The light-diffusing layer (A) and the adjacent layer (B) may further contain various additives if necessary, in addition to the flame retardant agent and the ultraviolet light absorber. Those additives which do not decrease the light transmittivity and the light diffusibility of the obtained light-diffusing plate for a liquid crystal display device can be used and are, for examples, a stabilizer such as an antioxidant, a light-stabilizer, and a heat stabilizer; a filler and a matte such as an organic filler and an inorganic filler; a coloring agent such as a dye and a pigment; a near-infrared light absorbing agent; a plasticizer; a lubricant; an antistatic agent; a flame retardant agent; a resin; and a soft polymer. The additives can be used alone or in combination of two or more, and may have a content which is adequately selected within a range for providing no negative effect against the object of the present invention.

The light-diffusing plate for a liquid crystal display device according to the present invention may have, for example, an adhesive layer and a moisture-proofing layer. The adjacent layer (B) may be a moisture-proofing layer. The adjacent layer which has a moisture-proofing function, can prevent the light-diffusing layer from moisture absorption, thereby to protect the layer against dimensional changes caused by moisture absorption. The adhesive layer may be any normally used adhesive layer as long as it does not impair the light transmittivity and the light diffusibility of the light-diffusing plate for a liquid crystal display device, and can be suitably selected depending on the components of a layer to adhere.

The moisture-proofing layer may be any layer which can prevent moisture absorption as long as it does not impair the light transmittivity and the light diffusibility of the light-diffusing plate for a liquid crystal display device, and includes a layer prepared from an inorganic thin film made of, for example, polycarbonate, polyethylene terephthalate, glass, a thin film of metal, silicone, and boron. The light-diffusing plate for a liquid crystal display device, which has a moisture-proofing layer, can be more sufficiently prevented from dimensional changes caused by the moisture absorption.

In order to improve adhesion, each layer in the lamination structure of the light-diffusing plate for a liquid crystal display device may be surface-treated within a range for providing no negative effect against the object of the present invention. The surface treatment is not specifically limited, and any known surface treatment can be applied to improve the adhesion.

The light-diffusing plate for a liquid crystal display device according to the present invention has preferably a total light transmittance of 40% or more. The plate, which has a total light transmittance of less than 40%, may be built in the lighting surface of a liquid crystal display device to darken the whole surface, thereby to fail in providing a sufficient brightness. It has more preferably that of 45% or more. The total light transmittance can be determined by, for example, Haze meter HR-100 (manufactured by Murakami Color Research Laboratory).

The plate has preferably an angle of 20 degree or more at which a diffused light is detected to have a light intensity of 50% when the vertical transmission light is defined to have that of 100%. The plate, which has that of less than 20 degree, can not give sufficient light diffusibility, and due to the visible image of a light source such as a fluorescent lamp and a cold cathode fluorescent lamp, cannot provide the liquid crystal display device with a wholly uniform light intensity. The angle has more preferably that of 30 degree or more. The term "an angle at which a diffused light is detected to have a light intensity of 50% when the vertical transmission light is defined to have that of 100% signifies an angle for detecting a light intensity of 50% when a transmission light runs straight along the direction with an angle of 0 degree and is defined to have a light intensity of 100%. The angle can be determined by Gonio-photometer GP-1R (manufactured by Murakami Color Research Laboratory).

In the present invention, the light-diffusing plate for a liquid crystal display device has preferably a total light transmittance of 40% or more and an angle of 20 degree or more at which a diffused light is detected to have a light intensity of 50% when the vertical transmission light is defined to have that of 100%.

The method for manufacturing the light-diffusing plate for a liquid crystal display device according to the present invention may be an ordinary co-extrusion molding method, a laminating method, a coating method, a sputtering method, an MOCVD method, a CVD method, and the like. In view of moldability, however, the laminating method and the coating method are preferred. As the laminating method, a known process may be used, and, for example, a process for heat-compression adhesion during the extrusion to form a sheet is preferred. As the coating method, a known process may be used, and, for example, a process for coating on a base material, drying if necessary, and heating is preferred.

The coating method includes roll-coating, spin-coating, dip-coating, spray-coating, flow-coating, and brush-coating. The order for forming layers in the light-diffusing plate for a liquid crystal display device by the coating method may be adequately selected depending on the material, thickness, and the like of the layer to be formed. Of the two or more layers comprised by the light-diffusing plate for a liquid crystal display device, any layer may be selected for the base material. However, the thicker layer is preferably selected for the base material.

The liquid crystal display device to which the light-diffusing plate for a liquid crystal display device according to the present invention is suitably applied includes a direct backlight type as shown in FIG. 2, an edge backlight type as shown in FIG. 3, and a frontlight type as shown in FIG. 4.

The liquid crystal display device comprises normally a liquid crystal element, a light-diffusing plate or a light-guiding plate, and a lighting unit. The lighting unit comprises normally a light source and a light-reflecting plate (reflector) placed at the back or the periphery of the light source. Examples of the light source are a plane light source such as an electroluminescence device (EL), a spot light source such as an LED, and a linear light source such as a cold cathode discharge tube. The light-diffusing plate for a liquid crystal display device according to the present invention is suitably used as the light-diffusing plate in a liquid crystal display device of direct backlight type as shown in FIG. 2, and is suitably used as the light-guiding plate in a liquid crystal display device of edge backlight type as shown in FIG. 3 and of frontlight type as shown in FIG. 4. According to the present invention, the light-guiding plate has preferably a function to guide the light coming from the lighting unit toward the face of a liquid crystal display element and further a function to diffuse the guided light.

In the direct backlight type liquid crystal display device as shown in FIG. 2 as an example, the plate faces of the light-diffusing plate 1 function as a light-incidence face and a light-emission face, respectively. As the light source 2, a plane light source such as an electroluminescence device (EL), a spot light source such as an LED, and a linear light source such as a cold cathode discharge tube may be used.

In the edge backlight type liquid crystal display device as shown in FIG. 3 as an example, the light source 12 is a linear light source, and is positioned near at least one side of the light-guiding plate 11. The linear light source may be straight-shaped, L-shaped, or angular C-shaped. In these cases, their respective faces receiving the light coming from the light source are 1, 2, and 3 in number.

The liquid crystal display device of frontlight type as shown in FIG. 4 as an example has basically the same structure as the edge backlight type liquid crystal display device. In the frontlight type, however, the light emitted from the light-guiding plate 21 reflects on the surface of the liquid crystal display element 24. The reflection light transmits the light-guiding plate 21 again, and then is emitted toward the front face of the liquid crystal display device. Accordingly, for the liquid crystal display element 24, the reflection type is used. The light source 22 is preferably a linear light source and is positioned near at least one edge face of the light-guiding plate 21. The linear light source may be straight-shaped, L-shaped, or angular C-shaped.

The present invention provides a polycarbonate resin composition for use in the light-diffusing layer (A), which comprises 100 parts by weight of a polycarbonate resin, 1 to 10 parts by weight of a particle-shaped resin being different from the polycarbonate resin in refractive index, and 0.005 to 0.2 parts by weight of the metal salt of an organic sulfur compound. The polycarbonate resin composition comprising the polycarbonate resin, the particle-shaped resin being different from the polycarbonate resin in refractive index, and the metal salt of an organic sulfur compound, can be used to provide a light-diffusing plate for a liquid crystal display device which has both high light transmittivity and light-diffusibility and is excellent in flame retardancy.

In the polycarbonate resin composition for the light-diffusing layer (A), preferable examples of compounds, contents, and mixing methods of the polycarbonate resin, the particle-shaped resin being different from the polycarbonate resin in refractive index, and the metal salt of an organic sulfur compound are described before. The polycarbonate resin composition for the light-diffusing layer (A) has a particularly preferred embodiment wherein the organic sulfur compound is at least one selected from the metal salts of organic sulfur compounds: N-(p-tolylsulfonyl)-p-toluenesulfoimide, N-(N'-benzylaminocarbonyl)sufanylimide, N-(phenylcarboxyl)-sufanylimide, diphenylsulfone-3-sulfonic acid, diphenylsulfone-3,3'-disulfonic acid, diphenylsulfone-3,4'-disulfonic acid, p-toluenesulfonic acid, p-styrenesulfonic acid, 1-naphthalenesulfonic acid, isophthalic acid dimethyl-5-sulfonic acid, 2,6-naphthalenedisulfonic acid, benzenesulfonic acid, o-benzenedisulfonic acid, 2,4,6-trichloro-5-sulfoisophtalic acid dimethyl, 2,5-dichlorobenzenesulfonic acid, 2,4,5-trichlorobenzenesulfonic acid, and perfluoroalkanesulfonic acid.

EFFECT OF THE INVENTION

The high luminance light-diffusing plate for a liquid crystal display device according to the present invention, which has the structure described before, can give a assured or improved luminance with assured light-diffusibility, suppress itself from dimensional changes caused by moisture absorption, and also prevent the device from deterioration caused by ultraviolet light generated from a lighting unit, in comparison with a conventional plate having the same thickness. Furthermore, the light-diffusing plate for a liquid crystal display device according to the present invention can be used to solve a problem that a conventional light-diffusing plate made of an acrylic resin is used to give warp and crack, and to improve significantly transmittivity, light-diffusibility, light resistance, and flame retardancy if necessary, in comparison with a conventional plate made of a polycarbonate resin. Consequently, the light-diffusing plate according to the present invention also can be suitably used for the liquid crystal display devices in household electric appliances.

EXPLANATION OF REFERENCE NUMERALS

Figure 1:
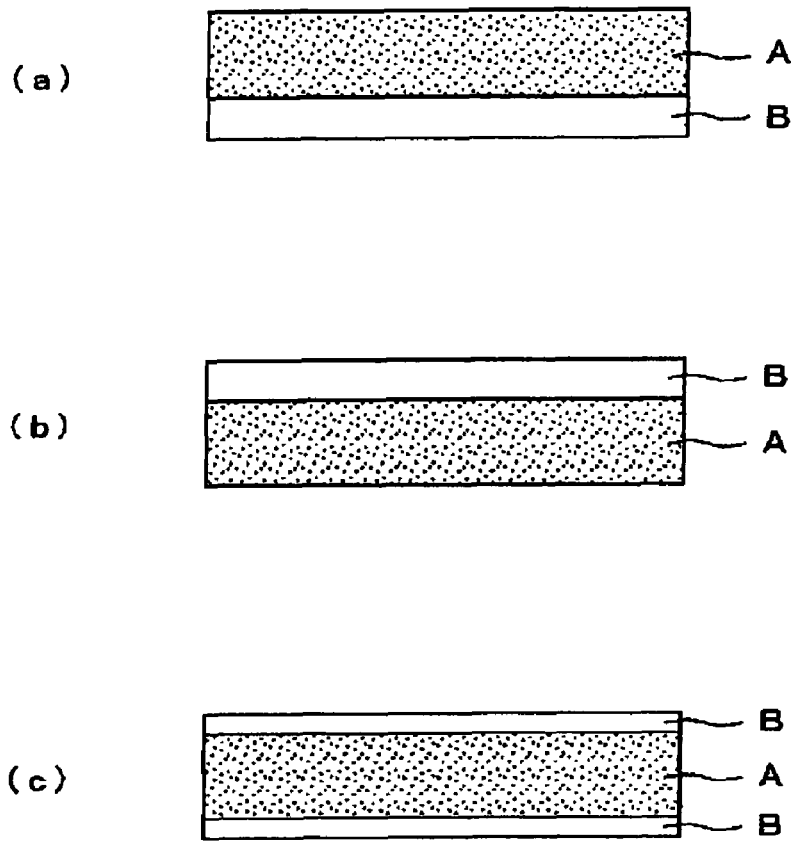
FIG. 1 is schematic drawings of preferred configurations of the light-diffusing plate for a liquid crystal display device according to the present invention.
Figure 2:
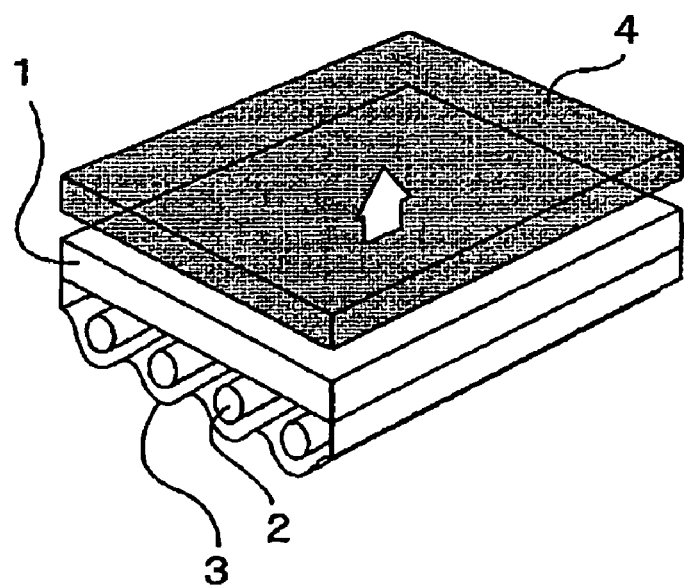
FIG. 2 shows a schematic view of the liquid crystal display device of direct backlight type.
Figure 3:
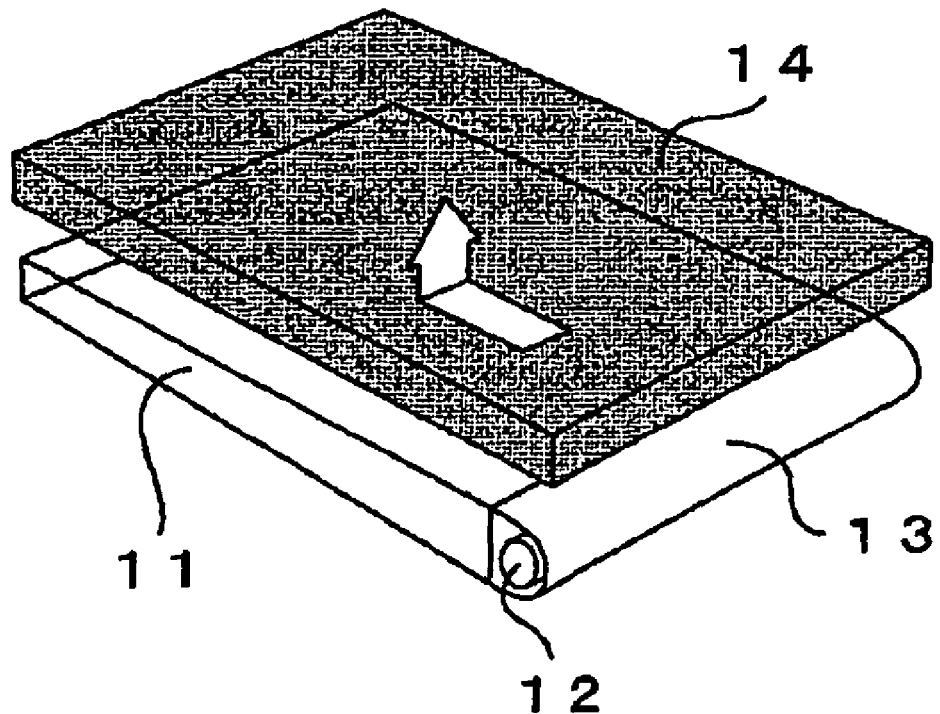
FIG. 3 shows a schematic view of the liquid crystal display device of edge backlight type.
Figure 4:
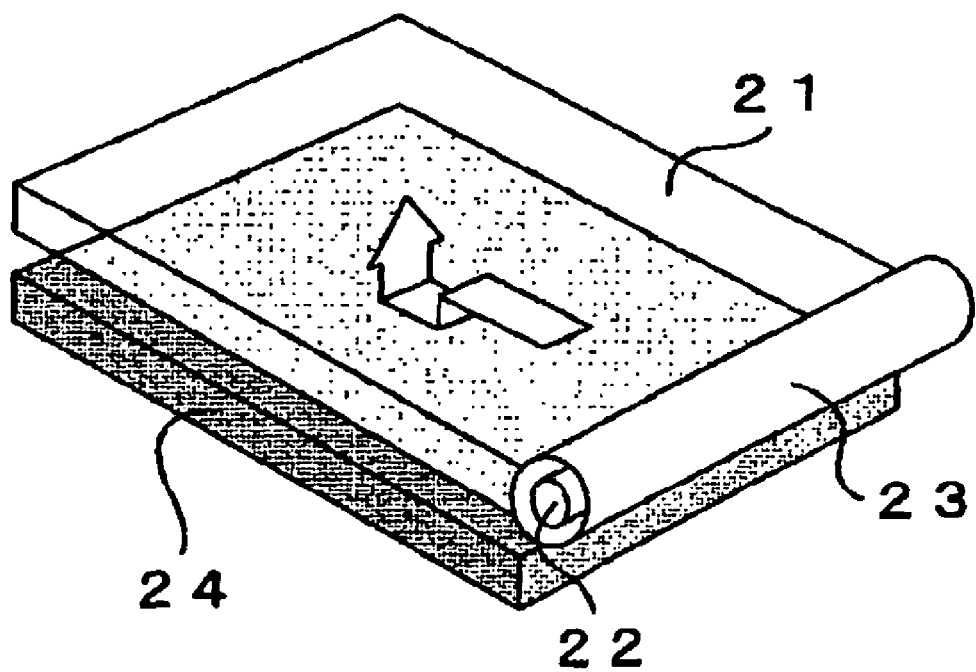
FIG. 4 shows a schematic view of the liquid crystal display device of frontlight type.

1: light-diffusing plate
2: light source
3: reflector
4: liquid crystal display element 11: light-guiding plate
12: light source
13: reflector
14: liquid crystal display element
21: light-guiding plate
22: light source
23: reflector
24: liquid crystal display element

DETAILED DESCRIPTION OF THE INVENTION

The present invention is described below in more detail referring to the examples. The present invention, however, is not limited only to these examples. Unless otherwise noted, the term "parts" signifies the "weight parts".

EXAMPLES 1 TO 3 AND COMPARATIVE EXAMPLES 1 And 2

The polycarbonate resin plate A (EC4, 2 mm in thickness, manufactured by Nippon Polyester Co., Ltd.) as a light-diffusing layer (A) was coated with an acrylic-based resin A (UV-P501N10, manufactured by Nippon Shokubai Co., Ltd.) by a flow-coating method. The coating resin A was dried and heated to give a light-diffusing plate for Example 1. An acrylic-based resin film B (SD008, manufactured by Kanegabuchi Chemical Industries Co., Ltd.) and a fluorine-based resin film A (DX-14, manufactured by Denki Kagaku Kogyo Kabushiki Kaisha) were laminated on the same polycarbonate resin plate A by a thermo-lamination method, thereby to give a light-diffusing plate for Example 2 and Example 3. All of the acrylic-based resin coating-film layer, the acrylic-based resin film layer, and the fluorine-based resin film layer contained an ultraviolet light absorber.

Separately, a polycarbonate resin plate A (EC4, 2 mm in thickness, manufactured by Nippon Polyester Co., Ltd.) with no acrylic resin coated was prepared for Comparative Example 1, and an acrylic resin plate C (SUMIPEX-B, 2 mm in thickness, manufactured by Sumitomo Chemical Co., Ltd.) was prepared for Comparative Example 2.

For these light-diffusing plates, the following measurement methods were applied to evaluate Y-stimulus value, haze value, refractive index, elongation, and yellowing degree.

(Determination of Y-Stimulus Value, Haze Value, Refractive Index, Elongation, and Yellowing Degree)

The light source was set so that the acrylic-resin coating film layer, the acrylic resin film layer, or the fluorine-based resin film layer, (adjacent layer B) was positioned to the lower side (toward the light source side) to determine the Y-stimulus value using a spectrophotometer (UV-3100PC, manufactured by Shimadzu Corporation).

The haze value (%H) was determined using a turbidity meter (NDH-2000, manufactured by Nippon Denshoku Industries Co., Ltd.).

The refractive index of a material was determined using an Abbe's refractometer (1-type, manufactured by Atago Co., Ltd.)

The elongation was determined by measuring a dimensional change between before and after allowing the plate to stand at 60° C. by 95%RH for 100 hours.

The sample was irradiated with ultraviolet light under a condition of 100 mW/cm$^2$ irradiation, 63° C., and 50%RH using EYE SUPERTESTER (W14-type, manufactured by Iwasaki Electric Co., Ltd.), and then the yellowing degree was determined by a color meter (ZE-2000, Nippon Denshoku Industries Co., Ltd.).

Figure 5:
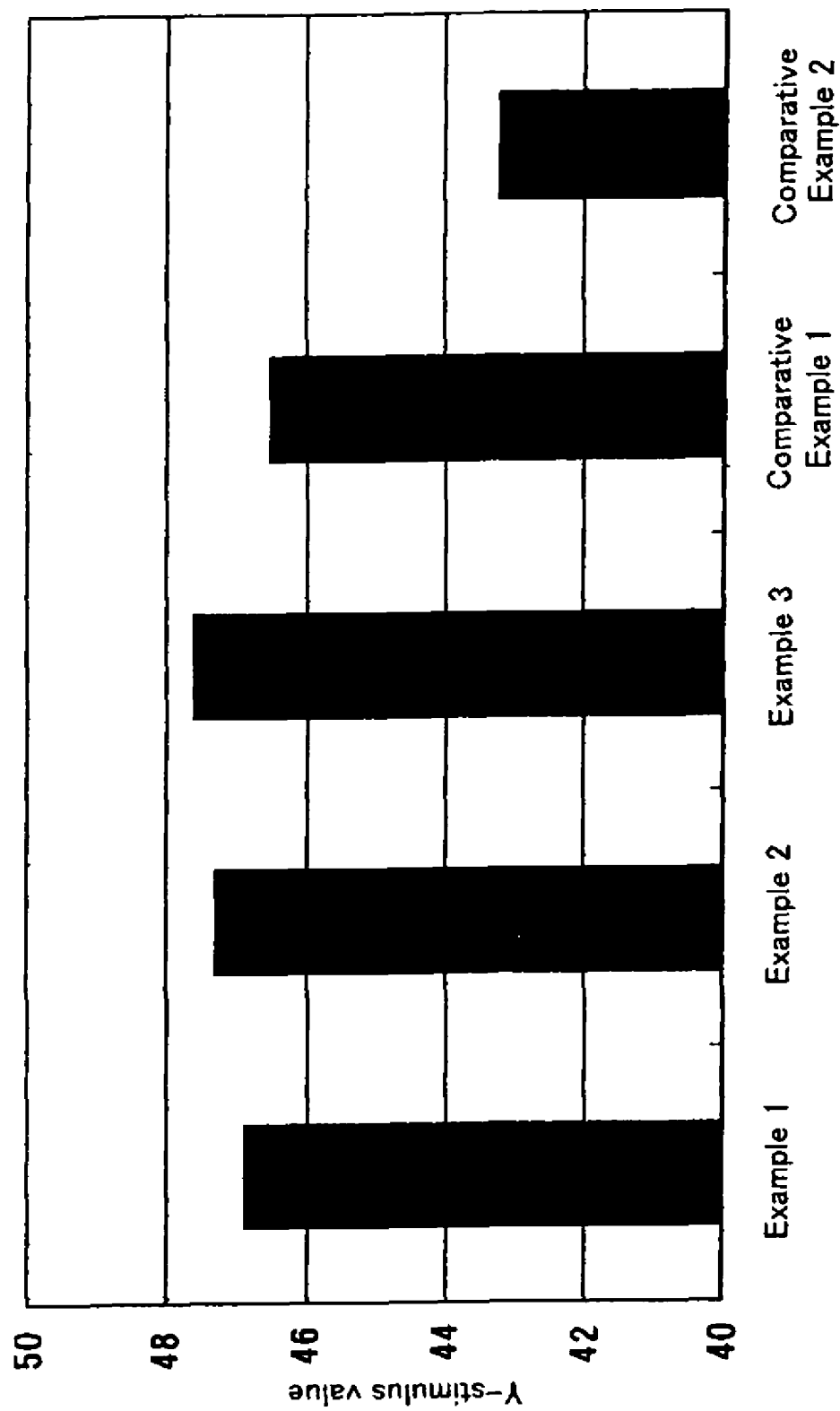
FIG. 5 is a graph showing Y-stimulus values of the light-diffusing plates fabricated in Examples 1 to 3 and Comparative Examples 1 and 2.

Results of Examples 1 to 3 and Comparative Examples 1 and 2 are given in Table 1. The Y-stimulus value graph is given in FIG. 5.

TABLE 1

|  | Method of lamination | Material of each layer | | Y-stimulus value | Haze value (%) | Refractive index Note 1) | Elongation (%) | Yellowing degree | Plate thickness (mm) |
|---|---|---|---|---|---|---|---|---|---|
|  |  | Light-diffusing layer A | Adjacent layer B |  |  |  |  |  |  |
| Example 1 | Coating | Polycarbonate resin A | Acrylic-based resin A | 46.9 | 93.2 | 1.53 | 0.1 | 2.3 | 2.01 |
| Example 2 | Lamination |  | Acrylic-based resin B | 47.3 | 93.2 | 1.49 | 0.1 | 1.4 | 2.03 |
| Example 3 |  |  | Fluorine-based resin A | 47.6 | 93.2 | 1.43 | 0.1 | 1.8 | 2.05 |
| Comparative Example 1 | Single layer | Polycarbonate resin A |  | 46.5 | 93.2 | 1.59 | 0.1 | 47.4 | 2.00 |
| Comparative Example 2 |  |  | Acrylic-based resin C | 43.2 | 93.2 | 1.49 | 0.4 | 2.3 | 2.01 |

Note 1)
If the adjacent layer B exists, the value of refractive index is the value of adjacent layer B.
Measuring instruments: Y-stimulus value Shimadzu Corporation Spectrophotometer UV-3100PC
Haze value Nippon Denshoku Industries Co., Ltd. Turbidity meter NDH-2000
Refractive index Atago Co., Ltd. Abbe's refractometer 1-type
Yellowing degree Nippon Denshoku Industries Co., Ltd. Color meter ZE-2000
Detail of samples
Polycarbonate resin A: Nippon Polyester Co., Ltd. EC4
Acrylic-based resin A: Nippon Shokubai Co., Ltd. UV-P501N10
Acrylic-based resin B: Kanegabuchi Chemical Industries Co., Ltd. SD008
Acrylic-based resin C: Sumitomo Chemical Co., Ltd. SUMIPEX-B
Fluorine-based resin A: Denki Kagaku Kogyo Kabushiki Kaisha DX-14

Compared with the light-diffusing plate (Comparative Example 1) comprising only the polycarbonate resin layer, the light-diffusing plate (Examples 1 to 3) comprising the polycarbonate resin layer and the acrylic resin layer or the fluororesin layer, improved in the Y-stimulus value with the assured haze value though the plate was thickened by the added adjacent layer, allowing improvement of the luminance with the assured light diffusibility.

The light-diffusing plates (Examples 1 to 3 and Comparative Example 1), which comprises the thick polycarbonate resin layer and the thin acrylic resin layer or the fluororesin layer, or only the polycarbonate resin layer, gave a smaller elongation and more favorable dimensional stability in comparison with the light-diffusing plate (Comparative Example 2) comprising only the thick acrylic resin layer.

From the evaluation of yellowing degree, the light-diffusing plate made of a polycarbonate resin, which was provided with a light-resistant layer (adjacent layer) containing an ultraviolet light absorber, improved in the resistance to ultraviolet light.

Examples 4 to 11 and Comparative Examples 3 to 8 In the following examples, the following raw materials were used to prepare the polycarbonate resin composition, which was then used to fabricate the light-diffusing plate.

The applied raw materials were as follows.
(1) Polycarbonate resin (hereinafter referred to simply as "PC"): Calbre 301-10, 1.59 of refractive index, manufactured by Sumitomo Dow Limited.
(2) Particle-shaped Resin (hereinafter referred to simply as "B-1"): EPOSTAR MA1002, crosslinked acrylic resin, 2 μm in average particle size, 1.49 of refractive index, manufactured by Nippon Shokubai Co., Ltd.
(3) Particle-shaped Resin (hereinafter referred to simply as "B-2"): PARALOID EXL5136, acrylic copolymer, 5 μm in average particle size, 1.46 of refractive index, manufactured by Rohm and Haas.
(4) Flame retarder (hereinafter referred to simply as "C-4"): Byowet C-4, manufactured by Bayer.

The PC, B-1, B-2, and C-4 were mixed in a tumbler for 10 minutes at their respective mixing ratios given in Table 3 and Table 4. Then, their respective mixtures were melted and kneaded in a single-screw extruder having a screw diameter of 40 mm (VS40-32, manufactured by Tanabe Plastics Machine Co., Ltd.) at a melting temperature of 260° C., thus to obtain pellets of their respective resin compositions. The prepared pellets of their respective resin compositions were used to mold through a T-die (VS40-32, manufactured by Tanabe Plastics Machine Co., Ltd.) at 260° C. into their respective sheets (sheet process). After the continuous processing, for Examples 4 to 11, an acrylic resin film having a thickness of 33 μm (1.49 of refractive index, manufactured by Kanegabuchi Chemical Industries Co., Ltd.) was laminated on the one face of the sheet, and then adhered by residual heat-compression at 80° C. to obtain various samples of the resin-made diffusing sheet (light-diffusing plate). For Comparative Examples 3 to 8, no acrylic-resin film was laminated. Table 3 and Table 4 show the thickness of respective light-diffusing plates.

For these light-diffusing plates, the following measurement methods were applied to evaluate in optical characteristics (total light transmittance and diffusivity), warp, impact strength, light resistance, and flame retardancy.

(Evaluation of Total Light Transmittance and Diffusion Angle)

Each of the prepared samples of resin-made diffusing sheets was cut to 5 cm×5 cm pieces. The cut specimens were used to determine a total light transmittance and a diffusion angle. The total light transmittance was determined by Haze meter HR-100 (manufactured by Murakami Color Research Laboratory), and the diffusivity was determined by Gonio-photometer GP-1R (manufactured by Murakami Color Research Laboratory). The sample which had a total light transmittance of 40% or higher and a diffusivity of 20 degree or higher was evaluated as acceptable. The angle at which a diffused light was detected to have a light intensity of 50% by Gonio-photometer when the vertical transmission light was defined to have that of 100% was referred to as the diffusivity.

(Warp Test)

Each of the prepared samples of resin-made diffusing sheets was cut to 30 cm×20 cm pieces. The cut specimens were conditioned in a thermo-hygrostat AG-327 (manufactured by Advantec Co., Ltd.) at 60° C. and 80%RH for 7 days. The conditioned specimens were then placed horizontally at a height of 10 mm from a Shamal Hotplate HHP-412 (manufactured by AS ONE Co., Ltd.) at 80° C. The height of center portion of a specimen was measured using Magnescale LU10A-1G5 (manufactured by Sony Magnescale Co., Ltd.). The measured value obtained 30 minutes after the start of the test was decided to be a base point, and the height was measured 6 hours after the starting time. The following equation was used to calculate the difference between the measured values, the absolute value of which was then used to assess the warp. The warp, which had an absolute value 0.5 mm or less, was judged as acceptable.

(Value measured 30 minutes after the test start)−(Value measured 6 hours after the test start)=Difference between the measured values (Light Resistance Test)

Each of the prepared samples of resin-made diffusing sheets was cut to 4 cm×5 cm pieces. The cut specimens were subjected to light resistance test using Eye Super (manufactured by Iwasaki Electric Co., Ltd.) under a condition of 100 mW/cm$^2$ irradiation for 24 hours. The yellow indexes (YI) before and after the test were determined using a spectrophotometer CMS-35SP (manufactured by Murakami Color Research Laboratory), and the difference in YI between before and after the test was derived by the following equation. The specimen, which had a difference in YI of less than 3, was judged as acceptable.

(YI value before the test)−(YI value after the test) Difference between the measured values (Impact Strength Test)

Each of the prepared samples of resin-made diffusing sheets was cut to 6 cm×6 cm pieces. The cut specimens were subjected to impact test using a DuPont impact tester (manufactured by Toyo Seiki Seisaku-sho, Ltd.) The specimen, which did not break at a strength of 100 kg·cm, was judged as acceptable.

(Flame Retardancy Test)

Each of the samples of the resin-made diffusing sheets obtained in Examples 6, 7, 10, and 11 was cut to 125 mm×13 mm pieces as the specimens for evaluating flame retardancy. After allowing the specimens to stand in a thermo-hygrostat at 23° C. and 50%RH for 48 hours, their flame retardancies were evaluated in accordance with the UL94 test (the test of flammability of plastics materials for equipment parts) specified by Underwriters Laboratories Inc. The UL94V is a method wherein a specimen having a specified size is kept to stand vertically and contacted with a burner flame for 10 seconds to determine an after-flame time and dripping property, which are used to evaluate flame retardancy. Flame retardancy is classified into grades shown in Table 2.

TABLE 2

|  | V-0 | V-1 | V-2 |
|---|---|---|---|
| After flame time for each sample | 10 seconds or less | 30 seconds or less | 30 seconds or less |
| Total after flame time of 5 samples | 50 seconds or less | 250 seconds or less | 250 seconds or less |
| Ignition of cotton by drip | Not ignited | Not ignited | Ignited |

The results of Examples 4 to 7 and Comparative Examples 3 to 6 are given in Table 3.

TABLE 3

| | | Example | | | | Comparative Example | | | |
|---|---|---|---|---|---|---|---|---|---|
| | | 4 | 5 | 6 | 7 | 3 | 4 | 5 | 6 |
| PC (parts) | | 100 | 100 | 100 | 100 | 100 | 100 | 100 | 100 |
| B-1 (parts) | | 1.3 | 2.5 | 2.5 | 5 | 1.3 | 2.5 | 5 | 2.5 |
| C-4 (parts) | | — | — | 0.03 | 0.05 | — | — | — | 0.03 |
| Lamination of acrylic resin | | Laminated | Laminated | Laminated | Laminated | Not laminated | Not laminated | Not laminated | Not laminated |
| Thickness of light-diffusing plate (mm) | | 1.8 | 2.0 | 1.8 | 1.8 | 1.8 | 2.0 | 1.8 | 2.0 |
| Optical characteristics | Total light transmittance (%) | 75 | 56 | 58 | 48 | 77 | 57 | 48 | 57 |
| | Diffusivity (degree) | 26 | 63 | 62 | 65 | 18 | 55 | 53 | 55 |
| | Judgment | ○ | ○ | ○ | ○ | X | ○ | ○ | ○ |
| Warp | | ○ | ○ | ○ | ○ | ○ | ○ | ○ | ○ |
| Impact strength | | ○ | ○ | ○ | ○ | ○ | ○ | ○ | ○ |
| Light resistance | | ○ | ○ | ○ | ○ | X | X | X | X |
| UL-94 judgment | | NR | NR | V-2 | V-2 | NR | NR | NR | V-2 |

○: Accepted
X: Not accepted
NR: No rating

Each of the light-diffusing plates comprising the laminated acrylic resin films (Examples 4 to 7) had a high total light transmittance and also maintained diffusion performance, and further showed excellent light resistance. To the contrary, each of the light-diffusing plates comprising no laminated acrylic resin film (Comparative Examples 3 to 6) was poor in light resistance, and particularly the light-diffusing plate of Comparative Example 3 failed to attain sufficient diffusion performance.

The light-diffusing plates containing a flame retardant agent (Examples 6 and 7) were cut into the strip specimens, which were then subjected to the flammability test in accordance with UL94. The plates showed the flame retardancy equivalent to V-2 grade.

The results of Examples 8 to 11 and Comparative Examples 7 to 10 are given in Table 4.

TABLE 4

| | | Example | | | | Comparative Example | | | |
|---|---|---|---|---|---|---|---|---|---|
| | | 8 | 9 | 10 | 11 | 7 | 8 | 9 | 10 |
| PC (parts) | | 100 | 100 | 100 | 100 | 100 | 100 | 100 | 100 |
| B-2 (parts) | | 1.3 | 2.3 | 2.3 | 5 | 1.3 | 2.3 | 5 | 5 |
| C-4 (parts) | | — | — | 0.03 | 0.05 | — | — | — | 0.05 |
| Lamination of acrylic resin | | Laminated | Laminated | Laminated | Laminated | Not laminated | Not laminated | Not laminated | Not laminated |
| Thickness of light-diffusing plate (mm) | | 1.8 | 2.0 | 1.8 | 1.8 | 1.8 | 2.0 | 1.8 | 1.8 |
| Optical characteristics | Total light transmittance (%) | 76 | 58 | 58 | 50 | 75 | 57 | 50 | 50 |
| | Diffusivity (degree) | 25 | 61 | 62 | 64 | 16 | 50 | 51 | 51 |
| | Judgment | ○ | ○ | ○ | ○ | X | ○ | ○ | ○ |
| Warp | | ○ | ○ | ○ | ○ | ○ | ○ | ○ | ○ |
| Impact strength | | ○ | ○ | ○ | ○ | ○ | ○ | ○ | ○ |
| Light resistance | | ○ | ○ | ○ | ○ | X | X | X | X |
| UL-94 judgment | | NR | NR | V-2 | V-2 | NR | NR | NR | V-2 |

○: Accepted
X: Not accepted
NR: No rating

Each of the light-diffusing plates comprising the laminated acrylic resin films (Examples 8 to 11) had a high total light transmittance and also maintained diffusion performance, and further showed excellent light resistance. To the contrary, each of the light-diffusing plates comprising no laminated acrylic resin film (Comparative Examples 7 to 10) was poor in light resistance, and particularly the light-diffusing plate of Comparative Example 7 failed to attain sufficient diffusion performance.

The light-diffusing plates containing a flame retardant agent (Examples 10 and 11) were cut into the strip specimens, which were then subjected to the flammability test in accordance with UL94. The plates showed the flame retardancy equivalent to V-2 grade.

[Industrial Applicability]

The high luminance light-diffusing plate for a liquid crystal display device according to the present invention, which has the structure as described before, can give a assured or improved luminance with assured light-diffusibility, suppress itself from dimensional changes caused by moisture absorption, and also prevent the device from deterioration caused by ultraviolet light generated from a lighting unit, in comparison with a conventional plate having the same thickness. Furthermore, the light-diffusing plate for a liquid crystal display device according to the present invention can be used to solve a problem that a conventional light-diffusing plate made of an acrylic resin is used to give warp and crack, thereby to improve transmittivity, light-diffusibility, light resistance, and flame retardancy if necessary, in comparison with a conventional plate made of a polycarbonate resin. Consequently, the light-diffusing plate according to the present invention also can be suitably used for the liquid crystal display devices in household electric appliances.

The invention claimed is:

1. A light-diffusing plate for a direct backlight type liquid crystal display device which plate has a lamination structure comprising two or more kinds of plastic layers; said lamination structure having at least two layers of which are different from each other in refractive index, wherein the lamination structure comprises a light-diffusing layer (A) and an adjacent layer (B), wherein the light-diffusing layer (A) is greater than the adjacent layer (B) in thickness, wherein the light-diffusing layer (A) has an equilibrium water absorption of 0.5% or less, and wherein the light-diffusing layer (A) comprises a polycarbonate resin, and wherein the adjacent layer (B) comprises an acryl resin.

2. The light-diffusing plate for a direct backlight type liquid crystal display device according to claim 1, wherein the adjacent layer (B) contains an ultraviolet light absorber.

3. The light-diffusing plate for a direct backlight type liquid crystal display device according to claim 1, wherein the light-diffusing plate comprises a light-diffusing layer (A) which is prepared by mixing 100 parts by weight of a polycarbonate resin with 1-10 parts by weight of the particle-shaped resin being different from the polycarbonate resin in refractive index.

4. The light-diffusing plate for a direct backlight type liquid crystal display device according to claim 1, wherein the light-diffusing plate has a total light transmittance of 40% or more and an angle of 20 degree or more at which a diffused light is detected to have a light intensity of 50% when the vertical transmission light is defined to have that of 100%.

5. The light-diffusing plate for a direct backlight type liquid crystal display device according to claim 1, wherein the light-diffusing layer (A) and the adjacent layer (B) differ in refractive index by at least 0.05.

6. The light-diffusing plate for a direct backlight type liquid crystal display device according to claim 3, wherein the light-diffusing layer (A) further comprises at least one metal salt of an organic sulfur compound.

7. The light-diffusing plate for a direct backlight type liquid crystal display device according to claim 6, wherein the at least one metal salt of an organic sulfur compound is selected from the group consisting of:

N-(p-tolylsulfonyl)-p-toluenesulfoimide,
N-(N'-benzylaminocarbonyl)sufanylimide,
N-(phenylcarboxyl)-sufanylimide,
diphenylsulfone-3-sulfonic acid,
diphenylsulfone-3,3'-disulfonic acid,
diphenylsulfone-3,4'-disulfonic acid, p-toluenesulfonic acid, p-styrenesulfonic acid, 1-naphthalenesulfonic acid, isophthalic acid dimethyl-5-sulfonic acid,
2,6-naphthalenedisulfonic acid,
benzenesulfonic acid,
o-benzenedisulfonic acid,
2,4,6-trichloro-5-sulfoisophtalic acid dimethyl,
2,5-dichlorobenzenesulfonic acid,
2,4,5-trichlorobenzenesulfonic acid, and
perfluoroalkanesulfonic acid;

and is added at a content of 0.005 to 0.2 parts by weight based on 100 parts by weight of the polycarbonate resin.

8. The light-diffusing plate for a direct backlight type liquid crystal display device of claim 1, wherein said light-diffusing layer (A) has a thickness of from 0.5 to 3 mm and said adjacent layer (B) has a thickness of from 0.001 to 1 mm.

9. A liquid crystal display device comprising the light-diffusing plate of claim 1, a direct backlight, and a liquid crystal display element.

* * * * *